(12) United States Patent
Chu et al.

(10) Patent No.: US 11,633,809 B2
(45) Date of Patent: Apr. 25, 2023

(54) GRAIN-ORIENTED SILICON STEEL HAVING HEAT-RESISTANT MAGNETIC DOMAIN AND MANUFACTURING METHOD THEREOF

(71) Applicant: BAOSHAN IRON & STEEL CO., LTD., Shanghai (CN)

(72) Inventors: Shuangjie Chu, Shanghai (CN); Zipeng Zhao, Shanghai (CN); Yongjie Yang, Shanghai (CN); Changsong Ma, Shanghai (CN); Meihong Wu, Shanghai (CN); Yaming Ji, Shanghai (CN); Aihua Ma, Shanghai (CN); Weiyong Xie, Shanghai (CN); Hai Liu, Shanghai (CN); Jianguo Guo, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 201 days.

(21) Appl. No.: 17/041,323

(22) PCT Filed: Jun. 20, 2018

(86) PCT No.: PCT/CN2018/092008
§ 371 (c)(1),
(2) Date: Sep. 24, 2020

(87) PCT Pub. No.: WO2019/184104
PCT Pub. Date: Oct. 3, 2019

(65) Prior Publication Data
US 2021/0023659 A1    Jan. 28, 2021

(30) Foreign Application Priority Data
Mar. 30, 2018   (CN) .......................... 201810303841.8

(51) Int. Cl.
*B23K 26/364*   (2014.01)
*H01F 1/147*    (2006.01)
(Continued)

(52) U.S. Cl.
CPC .......... *B23K 26/364* (2015.10); *B23K 26/067* (2013.01); *B23K 26/0622* (2015.10);
(Continued)

(58) Field of Classification Search
CPC ............ B23K 2101/38; B23K 2103/04; B23K 26/0622; B23K 26/0626; B23K 26/0665;
(Continued)

(56) References Cited

U.S. PATENT DOCUMENTS 5,013,373 A      5/1991  Block
2010/0279141 A1  11/2010 Iwata et al.
(Continued)

FOREIGN PATENT DOCUMENTS

CN    101946017 A    1/2011
CN    101979676 A    2/2011
(Continued)

OTHER PUBLICATIONS

European Patent Office, Extended European Search Report, Application No. PCT/CN2018092008, dated Nov. 18, 2020, in 12 pages.
(Continued)

*Primary Examiner* — Jenny R Wu
(74) *Attorney, Agent, or Firm* — Procopio, Cory, Hargreaves & Savitch LLP (57) ABSTRACT

A heat-resistant magnetic domain refined grain-oriented silicon steel, a single-sided surface or a double-sided surface of which has several parallel grooves which are formed in a grooving manner, each groove extends in the width direction of the heat-resistant magnetic domain refined grain-oriented silicon steel, and the several parallel grooves are uniformly
(Continued)

distributed along the rolling direction of the heat-resistant magnetic domain refined grain-oriented silicon steel. Each groove which extends in the width direction of the heat-resistant magnetic domain refined grain-oriented silicon steel is formed by splicing several sub-grooves which extend in the width direction of the heat-resistant magnetic domain refined grain-oriented silicon steel. The manufacturing method for a heat-resistant magnetic domain refined grain-oriented silicon steel comprises the step of: forming grooves on a single-sided surface or a double-sided surface of a heat-resistant magnetic domain refined grain-oriented silicon steel in a laser grooving manner, a laser beam of the laser grooving is divided into several sub-beams by a beam splitter, and the several sub-beams form the several sub-grooves which are spliced into the same groove.

16 Claims, 4 Drawing Sheets

(51) Int. Cl.
| | | |
|---|---|---|
| *C21D 9/46* | (2006.01) | |
| *C21D 8/12* | (2006.01) | |
| *C21D 6/00* | (2006.01) | |
| *B23K 26/067* | (2006.01) | |
| *B23K 26/06* | (2014.01) | |
| *B23K 26/0622* | (2014.01) | |
| *B23K 103/04* | (2006.01) | |
| *B23K 101/38* | (2006.01) | |
| *H01F 27/245* | (2006.01) | |

(52) U.S. Cl.
CPC ...... *B23K 26/0626* (2013.01); *B23K 26/0665* (2013.01); *C21D 6/008* (2013.01); *C21D 8/1222* (2013.01); *C21D 8/1255* (2013.01); *C21D 9/46* (2013.01); *H01F 1/147* (2013.01); *B23K 2101/38* (2018.08); *B23K 2103/04* (2018.08); *H01F 27/245* (2013.01)

(58) Field of Classification Search
CPC ............... B23K 26/067; B23K 26/364; C21D 2261/00; C21D 6/008; C21D 8/1222; C21D 8/1255; C21D 8/1294; C21D 9/46; H01F 1/147; H01F 1/14775; H01F 1/16; H01F 27/245; H01F 41/02
See application file for complete search history.

(56) References Cited

U.S. PATENT DOCUMENTS

| | | | |
|---|---|---|---|
| 2017/0348802 A1* | 12/2017 | Kwon | B23K 26/06 |
| 2018/0036838 A1 | 2/2018 | Hamamura et al. | |
| 2018/0071869 A1* | 3/2018 | Sakai | C22C 38/02 |

FOREIGN PATENT DOCUMENTS

| | | | | | |
|---|---|---|---|---|---|
| CN | 102941413 A | | 2/2013 | | |
| CN | 107502723 A | | 12/2017 | | |
| EP | 0870843 A1 | * | 10/1998 | | |
| EP | 3238870 A1 | | 11/2017 | | |
| EP | 3287532 A1 | | 2/2018 | | |
| JP | S56123855 U | | 2/1955 | | |
| JP | 2018-35412 A | | 3/2018 | | |
| KR | 10-2016-0019919 A | | 2/2016 | | |
| WO | 2012/164702 A1 | | 12/2012 | | |
| WO | WO-2012164702 A1 | * | 12/2012 | ......... | B23K 26/0821 |
| WO | WO-2015105048 A1 | * | 7/2015 | ............... | G01J 1/44 |
| WO | WO-2016171130 A1 | * | 10/2016 | ........... | B23K 26/364 |

OTHER PUBLICATIONS

Patent Office of the Russian Federation, Official Action, Application No. PCT/CN2018/092008, dated Apr. 21, 2021, in 7 pages.
India Patent Office, Examination Report under Sections 12 & 13, Application No. 202047046889, dated Dec. 27, 2021, in 6 pages.
Canadian Intellectual Property Office, Office Action, Application No. 3,096,747, dated Sep. 28, 2021, in 5 pages.
Brazilian Patent Office, Office Action, Application No. 112020018-2, in 1 page.
The Korean Intellectual Property Office, Notice of Office Action, Application No. 10-2020-7028461, dated Mar. 30, 2022, in 5 pages.
The Korean Intellectual Property Office, Notice of Allowance for Granting a Patent, Application No. 10-2020-07028461, dated Jun. 30, 2022, in 4 pages.
Japan Patent Office, Office Action, Application No. 2020-550770, dated Nov. 4, 2021, in 6 pages.
Japan Patent Office, Decision of Rejection, Application No. 2020-550770, dated Jul. 8, 2022, in 2 pages.

* cited by examiner

GRAIN-ORIENTED SILICON STEEL HAVING HEAT-RESISTANT MAGNETIC DOMAIN AND MANUFACTURING METHOD THEREOF

CROSS-REFERENCE TO RELATED APPLICATIONS

This application is a U.S. National Stage entry of PCT Application No: PCT/CN2018/092008 filed Jun. 20, 2018, which claims priority to Chinese Patent Application No. 201810303841.8 filed Mar. 30, 2018, the contents of which are incorporated herein by reference.

TECHNICAL FIELD

The invention relates to a grain-oriented silicon steel and manufacturing method thereof, and particularly to a grain-oriented silicon steel having heat-resistant refined magnetic domain and manufacturing method thereof.

BACKGROUND

Transformer is a basic component in the power transmission system. Its iron core is usually made by laminating or winding grain-oriented silicon steel, where the loss of iron core is usually referred to as iron loss. Due to the increasingly prominent global energy and environmental problems, the demand for energy saving and consumption reduction is increasing worldwide, and it is of great significance to the national economy and social environmental protection to reduce the iron loss of grain-oriented silicon steel.

A refined magnetic domain, i.e., the width of the magnetic domain being reduced, can effectively reduce the abnormal eddy current loss, and is an important method to reduce the iron loss of the grain-oriented silicon steel. In the prior art, the magnetic domain is refined by scribing on the surface of grain-oriented silicon steel so as to reduce iron loss. Methods for refining the magnetic domain by scribing are divided into two categories according to different grooving effect. One is non-heat-resistant refined magnetic domain by scribing, wherein a linear thermal stress region is formed on the surface of the grain-oriented silicon steel at a certain interval mainly by laser, plasma beam, electron beam, etc., such that a sub-magnetic domain forms around the region, thereby reducing the width of magnetic domain and reducing iron loss. After stress-relief annealing, the effect of the magnetic domain refinement by this method disappears with the elimination of thermal stress at the scribing, and the iron loss then goes back to the original level. Therefore, this method can be only used in the manufacture of laminated iron core transformers without stress-relief annealing. Another is heat-resistant refined magnetic domain by grooving, wherein a linear thermal stress region is formed on the surface of the grain-oriented silicon steel mainly by machinery, electro-chemical corrosion, laser beams, etc., such that the internal energy in the region is rearranged, the width of magnetic domain is reduced, thereby reducing iron loss. The iron loss of the grain-oriented silicon steel produced by this method does not go back after stress-relief annealing, and can be used for producing winding core transformers that require stress-relief annealing. The winding core transformers make full use of the superior magnetic properties of the grain-oriented silicon steel in the rolling direction, thus have obvious advantages over laminated core transformers in terms of loss and noise, so they are getting popular in the market.

In the prior art, methods for refining magnetic domains by heat-resistant grooving usually include electrochemical, mechanical and laser manners. However, the heat-resistant grooving by electrochemical manner has complicated procedures, chemical pollution, and poor liability of the shape and the depth of the groove, thus it is difficult to obtain grain-oriented silicon steel plates with stable and uniform magnetic properties. The heat-resistant grooving by mechanical pressing has extremely high requirement on tooth rollers of the mechanical device, and causes quick wear of tooth rollers due to the high hardness of the magnesium silicate underlayer on the surface of the grain-oriented silicon steel, resulting in high cost in mass grooving. To form groove by multiple laser scanning, it requires high repeated positioning accuracy and thus is difficult in assembly line production. To form grooves or remelting areas by laser thermal melting, it tends to produce crater-like protrusions and spatters at and near the edge of the grooves, resulting in a decrease in the lamination factor of silicon steel sheets, and the finished transformer has the risk of breakover between sheets during the service.

Based on this, it is expected to obtain a grain-oriented silicon steel having heat-resistant refined magnetic domain, which has a controllable morphology of the groove, and has controlled molten deposits at the edges, thereby refining the magnetic domain and reducing iron loss. Meanwhile, the iron loss does not deteriorate after stress-relief annealing, which is widely used in the manufacturing of wound iron core transformers and so on.

DISCLOSURE OF INVENTION

One purpose of the invention is to provide a grain-oriented silicon steel having heat-resistant refined magnetic domain, wherein the morphology of the groove of the grain-oriented silicon steel is in a controllable state, and the molten deposits at the edges are obviously controlled, thereby refining the magnetic domain and reducing iron loss, and the iron loss does not deteriorate after stress-relief annealing, which is widely used in the manufacturing of wound iron core transformers and so on.

To achieve the above purpose, the invention provides a grain-oriented silicon steel having heat-resistant refined magnetic domain, characterized by multiple parallel grooves formed by grooving on surface of one side or of both sides of the grain-oriented silicon steel, wherein each groove extends in the width direction of the grain-oriented silicon steel, and said multiple parallel grooves are uniformly distributed along the rolling direction of the grain-oriented silicon steel having heat-resistant refined magnetic domain.

Further, the grain-oriented silicon steel having heat-resistant refined magnetic domain according to the present invention, wherein said each groove that extends in the width direction of the grain-oriented silicon steel is formed by splicing multiple sub-grooves that extend in the width direction of the grain-oriented silicon steel having heat-resistant refined magnetic domain.

Further, the grain-oriented silicon steel having heat-resistant refined magnetic domain according to the present invention, wherein the cross-section of said each sub-groove in the width direction of the grain-oriented silicon is in shape of inverted trapezoid, the long side of the trapezoid has a length $L_{l}$, and the hypotenuse of the trapezoid has a projected length $l_{e}$ in the width direction of the grain-oriented silicon steel.

Further, the grain-oriented silicon steel having heat-resistant refined magnetic domain according to the present invention, wherein length $l_e$ is in a range of no more than 8 mm. In the technical solution of the present invention, the inventor of the present case studied and found that when the projected length $l_e$ of the hypotenuse of the trapezoid in the width direction of the grain-oriented silicon steel is over 8 mm, the effect of the magnetic domain refinement is insufficient, and the iron loss of the grain-oriented silicon steel having heat-resistant refined magnetic domain is not significantly reduced. Therefore, the value range of the projected length $l_e$ of the hypotenuse of the trapezoid in the width direction of the grain-oriented silicon steel having heat-resistant refined magnetic domain is limited to no more than 8 mm in the present invention. Preferably, the value range of $l_e$ is limited to no more than 4 mm. In this preferred technical solution, the grain-oriented silicon steel has low iron loss and high magnetic permeability.

Further, the grain-oriented silicon steel having heat-resistant refined magnetic domain according to the present invention, wherein the trapezoid has a height of 5-60 μm.

In the technical solution of the present invention, the inventor of the present case studied and found that when the height m of the trapezoid is less than 5 μm, the effect of the magnetic domain refinement is insufficient, and the iron loss of the grain-oriented silicon steel having heat-resistant refined magnetic domain is not significantly reduced; when the height m of the trapezoid is more than 60 μm, the magnetic flux leakage at the groove is serious, and the magnetic permeability of the grain-oriented silicon steel is lowered. Therefore, the present invention limits the value range of the height m of the trapezoid to 5 μm-60 μm. Preferably, the height m of the trapezoid is limited to between 10 μm-45 μm. In this preferred technical solution, the grain-oriented silicon steel has low iron loss and high magnetic permeability.

Further, the grain-oriented silicon steel having heat-resistant refined magnetic domain according to the present invention, wherein, among said multiple sub-grooves that forms into one groove, two adjacent sub-grooves are spliced in way of being closely connected with each other, or overlapping with each other, or being transversely spaced with each other.

Further, the grain-oriented silicon steel having heat-resistant refined magnetic domain according to the present invention, wherein two adjacent sub-grooves have a transverse space $l_b$ of no more than 10 mm when transversely spaced with each other.

In the technical solution of the present invention, the inventor of the present case studied and found that the transverse space $l_b$ between two adjacent sub-grooves has a significant impact on the magnetic properties of the grain-oriented silicon steel having heat-resistant refined magnetic domain. When the transverse space $l_b$ is more than 10 mm, the effect of the magnetic domain refinement is not obvious and the iron loss is high. Therefore, the transverse space $l_b$ between two adjacent sub-grooves is limited to no more than 10 mm in the present invention. Further, the grain-oriented silicon steel having heat-resistant refined magnetic domain according to the present invention, wherein following formula is satisfied $$\frac{l_e + l_b}{L_t} \leq 0.2$$

wherein, $L_t$ is the length of the long side of the trapezoid, $l_e$ is the projected length of the hypotenuse of the trapezoid in the width direction of the grain-oriented silicon steel having heat-resistant refined magnetic domain, and $l_b$ is the lateral spacing.

In the technical solution of the present invention, the inventor of the present case studied and found that when $$\frac{l_e + l_b}{L_t}$$

is within 0.20, the improvement rate of iron loss of the obtained grain-oriented silicon steel having heat-resistant refined magnetic domain is high, reaching 6% and above. When $$\frac{l_e + l_b}{L_t}$$

is more than 0.2, the effect of the magnetic domain refinement is not obvious, and the improvement rate of iron loss is low.

Further, the grain-oriented silicon steel having heat-resistant refined magnetic domain according to the present invention, wherein two adjacent sub-grooves have an overlapping length $l_c$ of the overlapped section of no more than 1.5 times of $l_e$ when two adjacent sub-grooves overlap each other.

In the technical solution of the present invention, the inventor of the present case studied and found that when the overlapping length $l_c$ of the overlapped section exceeds 1.5 times of the projected length $l_e$ of the hypotenuse of the trapezoid in the width direction of the grain-oriented silicon steel having heat-resistant refined magnetic domain, the magnetic permeability of the grain-oriented silicon steel will be significantly lowered, and therefore, the overlapping length $l_c$ of the overlapped section is limited to no more than 1.5 times of the projected length $l_e$ of the hypotenuse of in the width direction of the grain-oriented silicon steel having heat-resistant refined magnetic domain in the present invention.

Further, the grain-oriented silicon steel having heat-resistant refined magnetic domain according to the present invention, wherein the adjacent grooves have a spacing d of 2-10 mm therebetween.

In the technical solution of the present invention, the inventor of the present case studied and found that when the adjacent grooves have a spacing d of less than 2 mm therebetween, the grooves are excessively dense, causing conspicuous magnetic flux leakage effect and making the magnetic permeability drop more than 0.2 T; when the adjacent grooves have a spacing d of more than 10 mm therebetween, the effect of the magnetic domain refinement is not obvious, and the iron loss is relatively high. Therefore, the spacing d of the adjacent grooves therebetween is limited to 2-10 mm in the present invention.

Further, the grain-oriented silicon steel having heat-resistant refined magnetic domain according to the present invention, wherein the adjacent grooves have a spacing d of 2-10 mm, and the multiple sub-grooves spliced into one groove have offset spacings do of no more than 0.4d in the rolling direction of the grain-oriented silicon steel.

In the technical solution of the present invention, the inventor of the present case studied and found that when the ratio of the offset spacing do of the multiple sub-grooves spliced into one groove in the rolling direction of the grain-oriented silicon steel to the spacing d of adjacent grooves therebetween is above 0.4, that is, when do is more than 0.4d, the magnetostriction of the grain-oriented silicon steel having heat-resistant refined magnetic domain causes the noise to rise significantly to 60 dBA and above, and when do is less than 0.4d, the magnetostrictive noise of the grain-oriented silicon steel having heat-resistant refined magnetic domain is significantly reduced. Therefore, the offset spacing do of the multiple sub-grooves spliced into one groove in the rolling direction of the grain-oriented silicon steel having heat-resistant refined magnetic domain is limited to no more than 0.4d in the present invention.

Further, the grain-oriented silicon steel having heat-resistant refined magnetic domain according to the present invention, wherein the grooving method is at least one selected from laser grooving, electrochemical grooving, teeth roller grooving, and high-pressure water jet grooving.

Further, the grain-oriented silicon steel having heat-resistant refined magnetic domain according to the present invention, wherein the grooving is laser grooving.

Correspondingly, another purpose of the invention is to provide a method for manufacturing the above-mentioned grain-oriented silicon steel having heat-resistant refined magnetic domain. This method effectively reduces the thermal diffusion deposits formed by laser ablation through reasonable design of the laser beam, and avoids the problem of inaccurate positioning caused by repeated laser scanning, thereby effectively refining magnetic domain, reducing iron loss, and preventing the iron loss of the grain-oriented silicon steel having heat-resistant refined magnetic domain from deteriorating after stress-relief annealing.

To achieve the above purpose, the invention provides a method for manufacturing a grain-oriented silicon steel having heat-resistant refined magnetic domain, comprising steps of: forming grooves on surface of one side or both sides of the grain-oriented silicon steel by means of laser grooving, wherein the laser beam of the laser grooving is split into multiple sub-beams by a beam splitter for forming multiple sub-grooves that are spliced into one groove.

In the method of the present invention, after the laser beam of the laser grooving is emitted from the laser, it passes through the beam splitter to form multiple sub-beams which are focused on the surface of the steel plate to form a group of parallel light spots, thus forming multiple sub-grooves that are spliced into one groove. After the laser beam passes through the beam splitter, the energy density of the sub-beam spots is reduced, and there is a certain energy gap among the light spots. The temperature rise of a single point on the surface of the grain-oriented silicon steel presents the dual characteristics of a brief cooling and rapid accumulation, thereby overcoming the problems of thermal melting and deformation caused by the continuous accumulation of heat in the traditional long-spot grooving method, so that the groove morphology of the grain-oriented silicon steel having heat-resistant refined magnetic domain of the present invention is in a controllable state, and the molten deposits at the edge can be significantly controlled.

It should be noted that in some embodiments, the sub-beams move on the surface of the grain-oriented silicon steel in a lattice manner. The formed sub-spots can be arranged in a single row or multiple rows, and their shapes can be circular or elliptical. In addition, when the sub-beams form multiple sub-grooves that are spliced into one groove on the surface of the grain-oriented silicon steel, the cross section of the sub-groove in the width direction of the grain-oriented silicon steel having heat-resistant refined magnetic domain can be in shape of inverted trapezoid.

Further, the method according to the present invention, wherein a laser generating pump used for laser grooving is at least one selected from $CO_2$ lasers, solid-state lasers, and fiber lasers. Further, the method according to the present invention, wherein a sub-beam formed by a single said sub-beam on the surface of the grain-oriented silicon steel has a single pulse instantaneous peak power density of $5.0 \times 10^5$ W/mm$^2$-$5.0 \times 10^{11}$ W/mm$^2$.

In the method of the present invention, the inventor of the present case studied and found that when the single pulse instantaneous peak power density of the sub-spot formed by a single sub-beam on the surface of the grain-oriented silicon steel is $5.0 \times 10^5$ W/mm$^2$ and above after the laser beam passes through the beam splitter, the magnetic domain of the grain-oriented silicon steel can be refined, the iron loss can be reduced, and meanwhile no obvious deposits can be formed on both sides of the groove, thereby avoiding the decrease of the lamination factor. This is because when the single pulse instantaneous peak power density of the sub-spot is less than $5.0 \times 10^5$ W/mm$^2$, the surface of the grain-oriented silicon steel cannot reach the melting or vaporization temperature during laser scanning, and the local micro-zone material of the grain-oriented silicon steel cannot be effectively ablated and stripped, failing in forming the groove needed to refine the magnetic domain. But when the single pulse instantaneous peak power density of the sub-spot is too high, exceeding $5.0 \times 10^{11}$ W/mm$^2$, the excessively high instantaneous energy will cause the surface temperature of the grain-oriented silicon steel to rise too high. Consequently, on the one hand, excessive heat will diffuse to the surroundings, making the grain-oriented silicon steel deform thermally. On the other hand, the molten or vaporized substances will accumulate near the groove, which greatly reduces the lamination factor of the grain-oriented silicon steel, and is easy to make the transformer core formed by stacking the grain-oriented silicon steel conduct in use, increasing the breakdown risk of the transformer during service. Therefore, the inventor of the present invention limits the single pulse instantaneous peak power density of the sub-spot formed by a single sub-beam on the surface of the grain-oriented silicon steel to $5.0 \times 10^5$ W/mm$^2$-$5.0 \times 10^{11}$ W/mm$^2$.

Further, the method according to the present invention, wherein a ratio of the single pulse instantaneous maximum peak power density to the single pulse instantaneous minimum peak power density of the sub-spot is no more than 20.

In the method of the present invention, the inventor of the present case studied and found that when the difference of the single pulse instantaneous peak power densities of the sub-spot is too large, that is, when the ratio of the single pulse instantaneous maximum peak power density to the single pulse instantaneous minimum peak power density of the sub-spot is more than 20, the efficiency of ablation to form grooves is significantly reduced, the iron loss is not significantly reduced, and certain deposits appear on both sides of the groove. Therefore, the inventor of the present invention limits the ratio of the single pulse instantaneous maximum peak power density to the single pulse instantaneous minimum peak power density of the sub-spot to no more than 20.

Further, the method according to the present invention, wherein a ratio of the diameter of the sub-spot to the interval between the focal centers of the sub-spots is in the range of 0.1-0.8.

In the method of the present invention, the inventor of the present case studied and found that the sizes and the spacings of the sub-spots have a significant impact on the magnetic properties of the grain-oriented silicon steel. This is because when the sub-spots are too large and their spacings are too small, a superimposition of ablation energy of the sub-spots is obvious, and the material on the surface of the grain-oriented silicon steel melts to molten material, which causes decrease of the lamination factor; conversely, when the sub-spots are too small and their spacings are too large, the ablated part which is formed after the sub-spots ablate the grain-oriented silicon steel needs a longer time gap to receive the energy of the next sub-spot. At this time, the temperature of the ablated part significantly decreases, the micro-zone material on the surface of the grain-oriented silicon steel cannot be peeled off, and the magnetic domain cannot be refined to reduce the iron loss. The inventor of this invention finds through repeated experiments that if the ratio of the diameter of the sub-spot to the interval between the focal centers of the sub-spots is less than 0.1, the reduction rate of the iron loss is limited, and if the ratio is more than 0.8, the lamination factor decreases significantly, and if the ratio is in the range of 0.1 to 0.8, the iron loss of grain-oriented silicon steel is significantly reduced and the lamination factor is high. Therefore, the inventor of the present invention limits the ratio of the diameter of the sub-spot to the interval between the focal centers of the sub-spots within the range of 0.1 to 0.8.

Further, the method according to the present invention, wherein the multiple sub-spots formed by the multiple sub-beams on the surface of the grain-oriented silicon steel have a total length of not more than 20 mm in the laser scanning direction.

In the method of the present invention, the inventor of the present case studied and found that when the total length of the multiple sub-spots formed by the multiple sub-beams on the surface of the grain-oriented silicon steel having heat-resistant refined magnetic domain is more than 20 mm in the laser scanning direction, the projected length $l_e$ of the hypotenuse of the trapezoid in the width direction of the grain-oriented silicon steel having heat-resistant refined magnetic domain is more than 8 mm, the effect of the magnetic domain refinement is limited, and the reduction rate of the iron loss is small. Therefore, the inventor of the present invention limits the total length of the multiple sub-spots formed by the multiple sub-beams on the surface of the grain-oriented silicon steel having heat-resistant refined magnetic domain to no more than 20 mm.

Further, the method according to the present invention, wherein the laser grooving is performed before or after the step of decarburization annealing of the grain-oriented silicon steel having heat-resistant refined magnetic domain; or, before or after the step of hot stretching leveling annealing of the grain-oriented silicon steel having heat-resistant refined magnetic domain.

Compared with the prior art, the grain-oriented silicon steel having heat-resistant refined magnetic domain and the method thereof have the following beneficial effects:

The morphology of the groove of the grain-oriented silicon steel having heat-resistant refined magnetic domain is in a controllable state, and the molten deposits at the edges are obviously controlled, thereby refining magnetic domain and reducing iron loss, and the iron loss does not deteriorate after stress-relief annealing.

The method for manufacturing the grain-oriented silicon steel having heat-resistant refined magnetic domain of the present invention, through appropriate design for laser beam, effectively reduces the thermal diffusion deposits formed by laser ablation, and avoids the problem of inaccurate positioning caused by repeated laser scanning, thereby effectively refining magnetic domain, reducing iron loss, and preventing the iron loss of the grain-oriented silicon steel having heat-resistant refined magnetic domain from deteriorating after stress-relief annealing. The method has high efficiency and low cost, which is widely used in the manufacturing of wound iron core transformers and so on.

DETAILED DESCRIPTION

The following will further explain and describe the grain-oriented silicon steel having heat-resistant refined magnetic domain and the method according to the present invention in conjunction with the description of the drawings and specific embodiments. However, the explanation and description do not improperly limit the technical solutions of the present invention.

Figure 1:
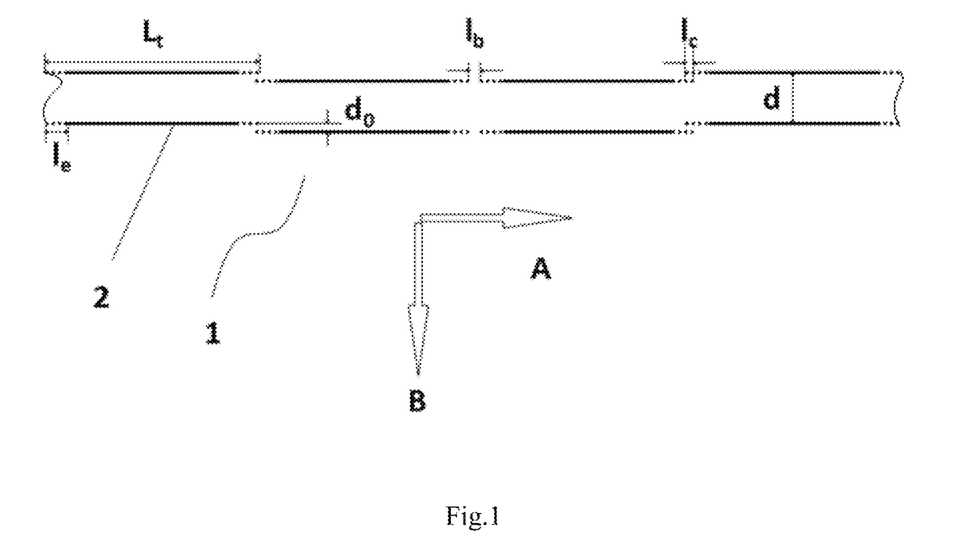
FIG. 1 is a schematic view showing a structure of the grooves of the grain-oriented silicon steel having heat-resistant refined magnetic domain in some embodiments according to the present invention.

It can be seen from FIG. 1 that each groove 1 of the grain-oriented silicon steel having heat-resistant refined magnetic domain in this technical solution extends in the width direction A, and said multiple parallel grooves 1 are uniformly distributed along the rolling direction B. The width direction A is perpendicular to the rolling direction B of the grain-oriented silicon steel having heat-resistant refined magnetic domain of Example 1. Each groove 1 is formed by splicing multiple sub-grooves 2 that extend in the width direction A. Two adjacent sub-grooves 2 overlap each other or have a transverse space $l_b$ between each other, and the overlapping length of the overlapped section formed by overlapping each other is $l_e$. Two adjacent grooves 1 have a spacing d, and the sub-grooves 2 have offset spacings do in the rolling direction B.

Figure 2:
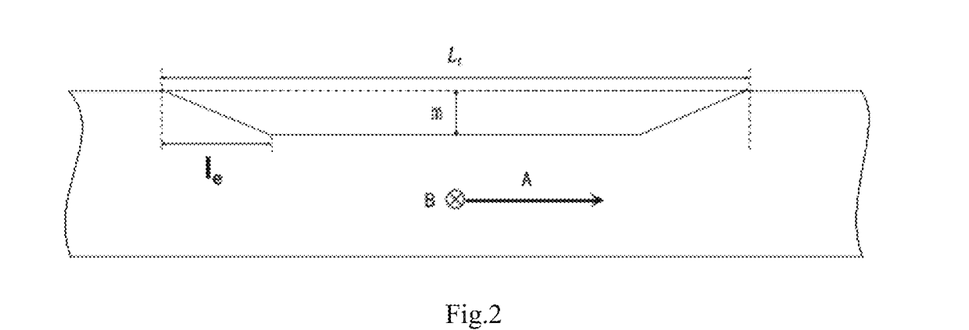
FIG. 2 is a schematic view showing a structure of any sub-groove of the grain-oriented silicon steel having heat-resistant refined magnetic domain in certain embodiments according to the present invention.

With further reference to FIG. 2, it can be seen that the cross-section of any sub-groove 2 of the grain-oriented silicon steel having heat-resistant refined magnetic domain of Example 1 in the width direction A is in shape of inverted trapezoid, the long side of the trapezoid has a length $L_t$, the hypotenuse of the trapezoid has a projected length $l_e$ in the width direction A, and the trapezoid has a height m.

Figure 3:
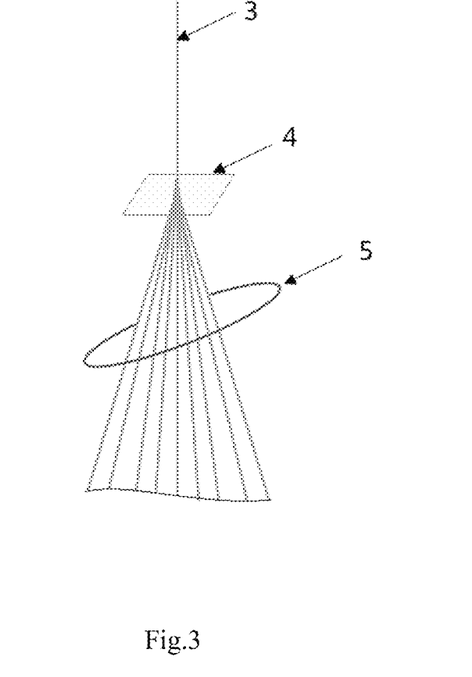
FIG. 3 is a schematic view showing laser spectroscopy in the method for manufacturing the grain-oriented silicon steel having heat-resistant refined magnetic domain according to the present invention.
Figure 4:
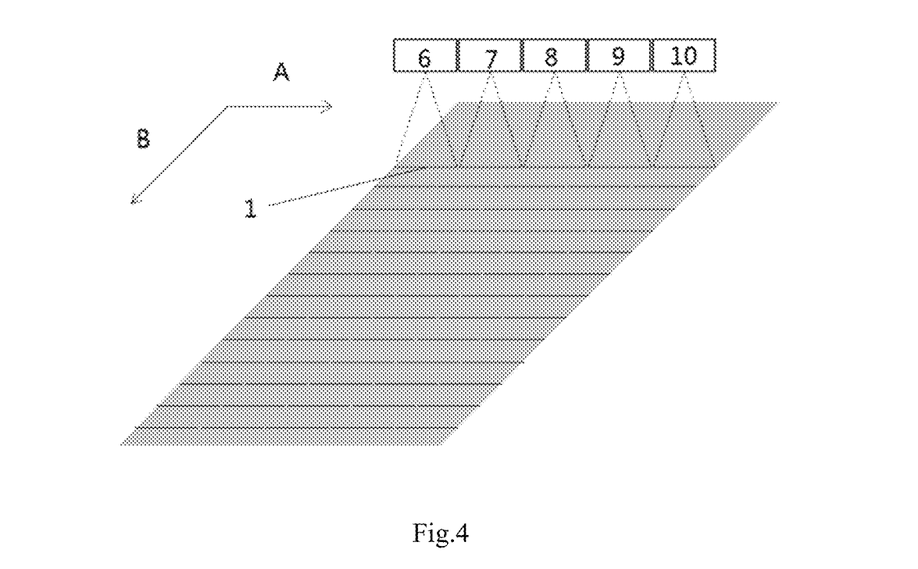
FIG. 4 is a schematic view showing laser grooving at a viewing angle in the method for manufacturing the grain-oriented silicon steel having heat-resistant refined magnetic domain according to the present invention.
Figure 5:
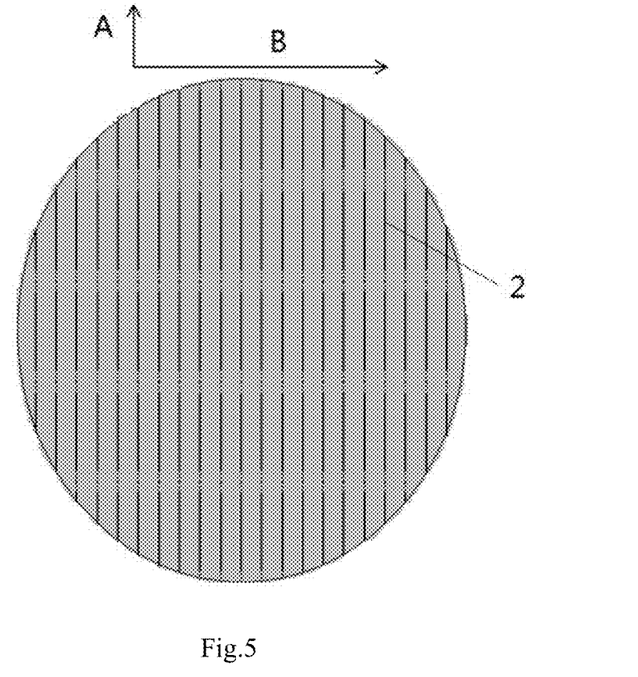
FIG. 5 is a schematic view showing laser grooving at another viewing angle in the method for manufacturing the grain-oriented silicon steel having heat-resistant refined magnetic domain according to the present invention.
Figure 6:
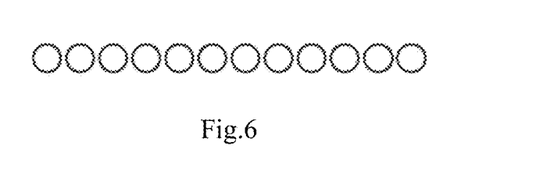
FIG. 6 illustrates the shape and arrangement of the sub-spots formed by the sub-beams in certain embodiments of the method for manufacturing the grain-oriented silicon steel having heat-resistant refined magnetic domain according to the present invention.
Figure 7:
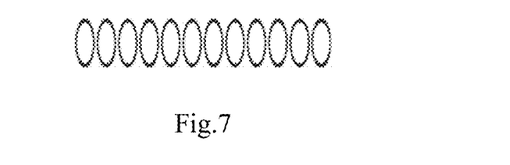
FIG. 7 illustrates the shape and arrangement of the sub-spots formed by the sub-beams in other embodiments of the method for manufacturing the grain-oriented silicon steel having heat-resistant refined magnetic domain according to the present invention.
Figure 8:
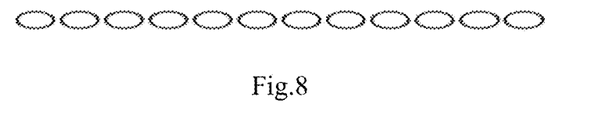
FIG. 8 illustrates the shape and arrangement of the sub-spots formed by the sub-beams in further embodiments of the method for manufacturing the grain-oriented silicon steel having heat-resistant refined magnetic domain according to the present invention.
Figure 9:
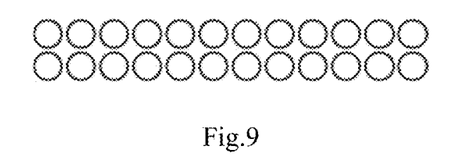
FIG. 9 illustrates the shape and arrangement of the sub-spots formed by the sub-beams in some embodiments of the method for manufacturing the grain-oriented silicon steel having heat-resistant refined magnetic domain according to the present invention.
Figure 10:
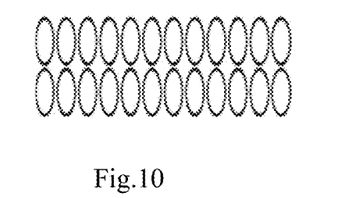
FIG. 10 illustrates the shape and arrangement of the sub-spots formed by the sub-beams in some other embodiments of the manufacturing method of the grain-oriented silicon steel having heat-resistant refined magnetic domain according to the present invention.
Figure 11:
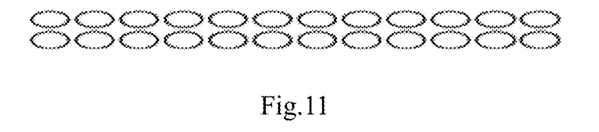
FIG. 11 illustrates the shape and arrangement of the sub-spots formed by the sub-beams in still other embodiments in the manufacturing method of the grain-oriented silicon steel having heat-resistant refined magnetic domain according to the present invention.

It can be seen from FIG. 3, FIG. 4 and FIG. 5, combined with FIG. 1 and FIG. 2 when necessary, that in the method for manufacturing the grain-oriented silicon steel having heat-resistant refined magnetic domain of Example 1, the laser beam 3 of the laser grooving is split into multiple sub-beams 5 by a beam splitter 4, and the multiple sub-beams 5 are scanned along the width direction A of the grain-oriented silicon steel having heat-resistant refined magnetic domain of Example 1 for forming multiple sub-grooves 2 that are spliced into one groove 1. 6, 7, 8, 9, 10 are different types of lasers, and in this embodiment, they can be $CO_2$ lasers, solid-state lasers, fiber lasers, and so on.

FIG. 6, FIG. 7, FIG. 8, FIG. 9, FIG. 10, and FIG. 11 respectively show shapes and arrangements of the sub-spots formed by the sub-beams in various embodiments of the method for manufacturing the grain-oriented silicon steel having heat-resistant refined magnetic domain. As can be seen, they are a single row of circular spots, a single row of elliptical spots, two rows of circular spots, two rows of elliptical spots, and two rows of elliptical spots respectively. It should be noted that shapes and arrangements of these spots are only examples and schematic, and are not intended to limit this technical solution.

Below, this technical solution will use specific example data to further describe the technical solution of this invention and prove its beneficial effects:

Examples 1-22 and Comparative Examples 1-10

Table 1 lists the characteristic parameters of the grooves of grain-oriented silicon steels having heat-resistant refined magnetic domain of Examples 1-22 and Comparative Examples 1-10.

TABLE 1

| | m (μm) | $L_t$ (mm) | $l_b$ (mm) | $l_e$ (mm) | σ | $l_c$ (mm) | d (mm) | $d_0$ (mm) | $d_0/d$ |
|---|---|---|---|---|---|---|---|---|---|
| Example 1 | 5 | 80 | 5 | 3 | 0.10 | 0.0 | 5.0 | 0.8 | 0.16 |
| Example 2 | 10 | 60 | 5 | 3 | 0.13 | 0.0 | 5.0 | 0.9 | 0.18 |
| Example 3 | 20 | 50 | 5 | 3 | 0.16 | 0.0 | 5.0 | 0.2 | 0.04 |
| Example 4 | 30 | 50 | 5 | 3 | 0.16 | 0.0 | 5.0 | 1.0 | 0.20 |
| Example 5 | 40 | 90 | 5 | 3 | 0.09 | 0.0 | 5.0 | 0.4 | 0.08 |
| Example 6 | 50 | 60 | 5 | 3 | 0.13 | 0.0 | 5.0 | 0.0 | 0.00 |
| Example 7 | 60 | 60 | 5 | 3 | 0.13 | 0.0 | 5.0 | 0.1 | 0.02 |
| Example 8 | 20 | 80 | 6 | 3 | 0.11 | 0.0 | 5.0 | 0.5 | 0.10 |
| Example 9 | 20 | 80 | 8 | 3 | 0.14 | 0.0 | 5.0 | 0.8 | 0.16 |
| Example 10 | 20 | 80 | 10 | 3 | 0.16 | 0.0 | 5.0 | 0.1 | 0.02 |
| Example 11 | 20 | 80 | 5 | 6 | 0.14 | 0.0 | 5.0 | 1.0 | 0.20 |
| Example 12 | 20 | 80 | 5 | 7 | 0.15 | 0.0 | 5.0 | 0.9 | 0.18 |
| Example 13 | 20 | 80 | 5 | 8 | 0.16 | 0.0 | 5.0 | 0.9 | 0.18 |
| Example 14 | 20 | 40 | 5 | 3 | 0.20 | 0.0 | 5.0 | 0.6 | 0.12 |
| Example 15 | 20 | 60 | 4 | 3 | 0.12 | 4.5 | 5.0 | 0.4 | 0.08 |
| Example 16 | 20 | 60 | 4 | 5 | 0.15 | 7.5 | 5.0 | 0.6 | 0.12 |
| Example 17 | 20 | 60 | 5 | 6 | 0.18 | 1.0 | 3.0 | 0.4 | 0.13 |
| Example 18 | 20 | 60 | 5 | 6 | 0.18 | 1.0 | 6.0 | 0.2 | 0.03 |
| Example 19 | 20 | 60 | 5 | 6 | 0.18 | 1.0 | 10.0 | 0.6 | 0.06 |
| Example 20 | 20 | 60 | 5 | 6 | 0.18 | 1.0 | 2.0 | 0.5 | 0.25 |
| Example 21 | 5 | 90 | 10 | 8 | 0.20 | 12.0 | 10.0 | 0.8 | 0.08 |
| Example 22 | 60 | 90 | 5 | 6 | 0.12 | 1.5 | 2.0 | 0.3 | 0.15 |
| Comparative Example 1 | *4* | 60 | 5 | 3 | 0.13 | 0.0 | 5.0 | 0.8 | 0.16 |
| Comparative Example 2 | *61* | 60 | 5 | 3 | 0.13 | 0.0 | 5.0 | 0.5 | 0.10 |
| Comparative Example 3 | *62* | 60 | 5 | 3 | 0.13 | 0.0 | 5.0 | 0.5 | 0.10 |
| Comparative Example 4 | 20 | 80 | *11* | 3 | 0.18 | 0.0 | 5.0 | 0.6 | 0.12 |
| Comparative Example 5 | 20 | 80 | 5 | *9* | 0.18 | 0.0 | 5.0 | 0.6 | 0.12 |
| Comparative Example 6 | 20 | 53 | 5 | 6 | *0.21* | 0.0 | 5.0 | 0.6 | 0.12 |
| Comparative Example 6 | | 60 | 4 | 3 | 0.12 | *4.6* | 5.0 | 0.4 | 0.08 |

TABLE 1-continued

| | m (μm) | $L_t$ (mm) | $l_b$ (mm) | $l_e$ (mm) | σ | $l_c$ (mm) | d (mm) | $d_0$ (mm) | $d_0/d$ |
|---|---|---|---|---|---|---|---|---|---|
| Comparative Example 7 | 20 | 60 | 4 | 5 | 0.15 | _7.6_ | 5.0 | 0.4 | 0.08 |
| Comparative Example 8 | 20 | 60 | 5 | 6 | 0.18 | 1.0 | _1.5_ | 0.4 | 0.27 |
| Comparative Example 9 | 20 | 60 | 5 | 6 | 0.18 | 1.0 | _10.5_ | 0 | 0.00 |
| Comparative Example 10 | 20 | | | | | | | | |

Amoung them, $\sigma = \dfrac{l_e + l_b}{L_t}$.

The grain-oriented silicon steels having heat-resistant refined magnetic domain of Examples 1-22 and Comparative Examples 1-10 are obtained by the following steps of:
(1) performing ironmaking, steelmaking, continuous casting, and hot rolling with the grain-oriented silicon steel, and then cold rolling to a final thickness of 0.23 mm;
(2) performing a decarburization annealing of 850° C., then coating a separation agent MgO on the surface after forming an oxide layer, and rolling into steel coils;
(3) annealing at a high temperature of 1200° C. for 20 hours, then coating a separation agent on the surface, and performing final annealing to form the grain-oriented silicon steel;
(4) implementing laser grooving on the surface of one side of the grain-oriented silicon steel (the specific process parameters of laser grooving are listed in Table 2).

Table 2 lists the specific process parameters of step (4) in the method for manufacturing the grain-oriented silicon steels having heat-resistant refined magnetic domain of Examples 1-22 and Comparative Examples 1-10.

TABLE 2

| | Laser output power (W) | Single pulse instantaneous peak power density of sub-pot (W/mm²) | Ratio of single pulse instantaneous maximum peak power density to single pulse instantaneous minimum peak power density of sub-spot | Ratio of the diameter of sub-spot to the interval between the focal centers of sub-spots | Total length of multiple sub-spots in laser scanning direction (mm) |
|---|---|---|---|---|---|
| Example 1~22 | 100 | 2.1E+07 | 2 | 0.31 | 4 |
| Comparative Example 1~10 | 100 | 2.1E+07 | 2 | 0.31 | 4 |

The grain-oriented silicon steels having heat-resistant refined magnetic domain of Examples 1-22 and Comparative Examples 1-10 were tested for magnetic conductive performance ($B_8$) and iron loss ($P_{17/50}$) before and after laser grooving, specifically using Epstein method to test the magnetic flux density of the grain-oriented silicon steel under an exciting magnetic field of 800 A/m, and the values $B_8$ in T were obtained; Epstein method was used to test the ineffective electric energy consumed by the magnetization of the grain-oriented silicon steel when the magnetic flux density reaches 1.7 T under an AC excitation field of 50 Hz, and the values $P_{17/50}$ in W/Kg were obtained. Test results are listed in Table 3.

TABLE 3

| | Before grooving | | After grooving | | Magnetic variation | |
|---|---|---|---|---|---|---|
| | $P_{17/50}$ (W/kg) | $B_8$ (T) | $P_{17/50}$ (W/kg) | $B_8$ (T) | $P_{17/50}$ (%) | $B_8$ (T) |
| Example 1 | 0.864 | 1.926 | 0.801 | 1.923 | 7.3% | 0.003 |
| Example 2 | 0.889 | 1.922 | 0.803 | 1.921 | 9.7% | 0.001 |
| Example 3 | 0.876 | 1.920 | 0.788 | 1.916 | 10.0% | 0.004 |
| Example 4 | 0.869 | 1.930 | 0.761 | 1.922 | 12.4% | 0.008 |
| Example 5 | 0.852 | 1.934 | 0.742 | 1.928 | 12.9% | 0.006 |
| Example 6 | 0.860 | 1.923 | 0.736 | 1.911 | 14.4% | 0.012 |
| Example 7 | 0.860 | 1.929 | 0.731 | 1.912 | 15.0% | 0.017 |
| Example 8 | 0.844 | 1.932 | 0.767 | 1.928 | 9.1% | 0.004 |
| Example 9 | 0.912 | 1.916 | 0.800 | 1.914 | 12.3% | 0.002 |
| Example 10 | 0.882 | 1.929 | 0.818 | 1.928 | 7.3% | 0.001 |
| Example 11 | 0.825 | 1.937 | 0.731 | 1.931 | 11.4% | 0.006 |
| Example 12 | 0.831 | 1.932 | 0.765 | 1.931 | 8.0% | 0.001 |
| Example 13 | 0.843 | 1.922 | 0.788 | 1.921 | 6.5% | 0.001 |
| Example 14 | 0.855 | 1.919 | 0.798 | 1.918 | 6.6% | 0.001 |
| Example 15 | 0.855 | 1.921 | 0.796 | 1.920 | 6.9% | 0.001 |
| Example 16 | 0.867 | 1.920 | 0.812 | 1.920 | 6.3% | 0.000 |
| Example 17 | 0.840 | 1.926 | 0.723 | 1.918 | 14.0% | 0.008 |
| Example 18 | 0.868 | 1.921 | 0.761 | 1.919 | 12.3% | 0.002 |
| Example 19 | 0.858 | 1.919 | 0.798 | 1.918 | 7.0% | 0.001 |
| Example 20 | 0.868 | 1.917 | 0.735 | 1.908 | 15.3% | 0.009 |
| Example 21 | 0.846 | 1.938 | 0.793 | 1.920 | 6.3% | 0.018 |
| Example 22 | 0.845 | 1.930 | 0.721 | 1.912 | 14.7% | 0.018 |
| Comparative Example 1 | 0.875 | 1.916 | 0.825 | 1.915 | 5.7% | 0.001 |
| Comparative Example 2 | 0.861 | 1.926 | 0.735 | 1.905 | 14.6% | 0.021 |
| Comparative Example 3 | 0.889 | 1.919 | 0.761 | 1.889 | 14.4% | 0.030 |
| Comparative Example 4 | 0.879 | 1.921 | 0.833 | 1.920 | 5.2% | 0.001 |
| Comparative Example 5 | 0.878 | 1.920 | 0.828 | 1.920 | 5.7% | 0.000 |
| Comparative Example 6 | 0.846 | 1.928 | 0.801 | 1.927 | 5.3% | 0.001 |
| Comparative Example 7 | 0.837 | 1.931 | 0.801 | 1.930 | 4.3% | 0.001 |
| Comparative Example 8 | 0.857 | 1.926 | 0.807 | 1.926 | 5.9% | 0.000 |
| Comparative Example 9 | 0.830 | 1.934 | 0.721 | 1.913 | 13.1% | 0.021 |
| Comparative Example 10 | 0.866 | 1.922 | 0.820 | 1.921 | 5.3% | 0.001 |

It can be seen from Table 3 that Examples 1-22 have good properties of iron loss and magnetic conduction, and the improvement rates of iron loss after laser grooving are all above 6% compared with those before laser grooving.

The trapezoid of Comparative Example 1 has a height m that is not within the scope of the present invention, and its improvement rate of iron loss is less than 6%.

Although Comparative Examples 2 and 3 have higher improvement rate of iron loss of grooving, their heights m of the trapezoid are too large and are beyond the scope of the present invention, resulting in a significant decrease in the magnetic flux density $B_8$.

The transverse space $l_b$ between two adjacent sub-grooves of Comparative Example 4 and the projected length $l_e$ of the hypotenuse of the trapezoid of Comparative Example 5 in the width direction of the grain-oriented silicon steel having heat-resistant refined magnetic domain are not within the scope of the present invention. Therefore, the improvement rates of iron loss of grooving are poor.

In Comparative Example 6, the length $L_t$ of the long side of the trapezoid, the transverse space $l_b$ between two adjacent sub-grooves, and the projected length $l_e$ of the hypotenuse of the trapezoid in the width direction of the grain-oriented silicon steel having heat-resistant refined magnetic domain are not within the range of the formula of the invention, so the grain-oriented silicon steel plate with significantly improved iron loss cannot be obtained.

In Comparative Examples 7 and 8, since the overlapping lengths $l_c$ of the overlapped section overlapped by two adjacent sub-grooves are beyond the scope of the present invention, the grain-oriented silicon steel plate with significantly improved iron loss cannot be obtained.

In Comparative Example 9, the spacing d between the adjacent grooves is too small, which exceeds the lower limit of the scope of the present invention, so that although the iron loss improves obviously, the magnetic flux density $B_8$ is significantly reduced; while in Comparative Example 10, the spacing d between the adjacent grooves exceeds the upper limit of the scope of the present invention, so that the improvement rate of iron loss is low, and the grain-oriented silicon steel plate with good magnetic properties cannot be obtained.

Examples 23-37 and Comparative Examples 11-15

Table 4 lists the characteristic parameters of the grooves of the grain-oriented silicon steel having heat-resistant refined magnetic domain of Examples 23-37 and Comparative Examples 11-15.

TABLE 4

|  | m (μm) | $L_t$ (mm) | $l_b$ (mm) | $l_e$ (mm) | σ | $l_c$ (mm) | d (mm) | $d_0$ (mm) | $d_0/d$ |
|---|---|---|---|---|---|---|---|---|---|
| Example 23 | 28 | 80 | 4 | 3 | 0.09 | 0.2 | 2 | 0.2 | 0.10 |
| Example 24 | 25 | 80 | 4 | 3 | 0.09 | 0.2 | 2 | 0.4 | 0.20 |
| Example 25 | 24 | 80 | 4 | 3 | 0.09 | 0.1 | 2 | 0.8 | 0.40 |
| Example 26 | 27 | 80 | 4 | 3 | 0.09 | 0.1 | 4 | 0.5 | 0.13 |
| Example 27 | 24 | 80 | 4 | 3 | 0.09 | 0.2 | 4 | 1 | 0.25 |
| Example 28 | 27 | 80 | 4 | 3 | 0.09 | 0.2 | 4 | 1.6 | 0.40 |
| Example 29 | 26 | 80 | 4 | 3 | 0.09 | 0.0 | 6 | 1 | 0.17 |
| Example 30 | 27 | 80 | 4 | 3 | 0.09 | 0.1 | 6 | 2 | 0.33 |
| Example 31 | 24 | 80 | 4 | 3 | 0.09 | 0.1 | 6 | 2.4 | 0.40 |
| Example 32 | 24 | 80 | 4 | 3 | 0.09 | 0.1 | 8 | 1 | 0.13 |
| Example 33 | 25 | 80 | 4 | 3 | 0.09 | 0.2 | 8 | 2 | 0.25 |
| Example 34 | 25 | 80 | 4 | 3 | 0.09 | 0.1 | 8 | 3.2 | 0.40 |
| Example 35 | 28 | 80 | 4 | 3 | 0.09 | 0.0 | 10 | 1 | 0.10 |
| Example 36 | 25 | 80 | 4 | 3 | 0.09 | 0.1 | 10 | 2 | 0.20 |
| Example 37 | 27 | 80 | 4 | 3 | 0.09 | 0.2 | 10 | 4 | 0.40 |
| Comparative Example 11 | 24 | 80 | 4 | 3 | 0.09 | 0.1 | 2 | *0.9* | *0.45* |
| Comparative Example 12 | 26 | 80 | 4 | 3 | 0.09 | 0.0 | 4 | *1.7* | *0.43* |
| Comparative Example 13 | 24 | 80 | 4 | 3 | 0.09 | 0.2 | 6 | *2.5* | *0.42* |
| Comparative Example 14 | 25 | 80 | 4 | 3 | 0.09 | 0.2 | 8 | *3.3* | *0.41* |
| Comparative Example 15 | 28 | 80 | 4 | 3 | 0.09 | 0.2 | 10 | *4.1* | *0.41* |

Amoung them, $\sigma = \dfrac{l_e + l_b}{L_t}$.

The grain-oriented silicon steels having heat-resistant refined magnetic domain of Examples 23-37 and Comparative Examples 11-15 are obtained by the following steps of:
(1) performing ironmaking, steelmaking, and hot rolling with the grain-oriented silicon steel, and then cold rolling to a thickness of 0.26 mm;
(2) implementing laser grooving on the surface of both sides of the cold-rolled plate (the specific process parameters of laser grooving are listed in Table 5);
(3) performing a decarburization annealing of 850° C. with the cold-rolled plate after grooving, then coating a separation agent MgO on its surface after forming an oxide layer, and rolling into steel coils;
(4) annealing at a high temperature of 1200° C. for 20 hours, then coating a separation agent on the surface and performing final annealing to form the silicon steel plate.

Table 5 lists the specific process parameters of step (2) in the method for manufacturing the grain-oriented silicon steels having heat-resistant refined magnetic domain of Examples 23-27 and Comparative Examples 11-15.

TABLE 5

| | Laser output power (W) | Single pulse instantaneous peak power density of sub-pot (W/mm²) | Ratio of single pulse instantaneous maximum peak power density to single pulse instantaneous minimum peak power density of the sub-spot | Ratio of the diameter of sub-spot to the interval between the focal centers of sub-spots | Total length of multiple sub-spots in laser scanning direction (mm) |
|---|---|---|---|---|---|
| Example 23-37 | 500 | 2.2E+06 | 3 | 0.30 | 10 |
| Comparative Example 11-15 | 500 | 2.2E+06 | 3 | 0.30 | 10 |

The grain-oriented silicon steels having heat-resistant refined magnetic domain of Examples 23-27 and Comparative Examples 11-15 were tested for magnetic conductive performance ($B_8$) and iron loss ($P_{17/50}$), specifically using Epstein method to test the magnetic flux density of the grain-oriented silicon steel under an exciting magnetic field of 800 A/m, and the values $B_8$ in T were obtained; Epstein method was used to test the ineffective electric energy consumed by the magnetization of the grain-oriented silicon steel when the magnetic flux density reaches 1.7 T under an AC excitation field of 50 Hz, and the values $P_{17/50}$ in W/Kg were obtained. The values $AWV_{17/50}$ of AC magnetostrictive noise of the grain-oriented silicon steels having heat-resistant refined magnetic domain of Examples 23-37 and Comparative Examples 11-15 were tested using SST100×500 single sheet method, and the unit is dBA. The test results are listed in Table 6.

TABLE 6

| | $P_{17/50}$ (W/kg) | $B_8$ (T) | $AWV_{17/50}$ (dBA) |
|---|---|---|---|
| Example 23 | 0.817 | 1.914 | 57.5 |
| Example 24 | 0.822 | 1.910 | 57.0 |
| Example 25 | 0.820 | 1.911 | 58.0 |
| Example 26 | 0.840 | 1.919 | 57.0 |
| Example 27 | 0.837 | 1.921 | 58.4 |
| Example 28 | 0.820 | 1.917 | 58.8 |
| Example 29 | 0.832 | 1.918 | 57.9 |
| Example 30 | 0.837 | 1.922 | 57.1 |
| Example 31 | 0.841 | 1.917 | 58.6 |
| Example 32 | 0.849 | 1.922 | 57.5 |
| Example 33 | 0.821 | 1.928 | 57.2 |
| Example 34 | 0.853 | 1.917 | 58.0 |
| Example 35 | 0.852 | 1.919 | 57.5 |
| Example 36 | 0.865 | 1.919 | 58.2 |
| Example 37 | 0.843 | 1.927 | 58.4 |
| Comparative Example 11 | 0.810 | 1.917 | 60.2 |
| Comparative Example 12 | 0.823 | 1.926 | 59.5 |
| Comparative Example 13 | 0.842 | 1.921 | 59.2 |
| Comparative Example 14 | 0.830 | 1.931 | 59.8 |
| Comparative Example 15 | 0.852 | 1.921 | 60.6 |

It can be seen from Table 6 that the iron loss $P_{17/50}$ and values of the magnetic flux density $B_8$ of Examples 23-37 and Comparative Examples 11-15 are both good, while the values of $d_0/d$ of Comparative Examples 11-15 are not within the scope of the present invention, making the AC magnetostrictive noise obviously loud.

Examples 38-54 and Comparative Examples 16-21

Table 7 lists the characteristic parameters of the grooves of the grain-oriented silicon steel having heat-resistant refined magnetic domain of Examples 38-54 and Comparative Examples 16-21.

TABLE 7

| | m (μm) | $L_t$ (mm) | $l_b$ (mm) | $l_e$ (mm) | σ | $l_c$ (mm) | d (mm) | $d_0$ (mm) | $d_0/d$ |
|---|---|---|---|---|---|---|---|---|---|
| Example 38 | 28.7 | 60 | 2 | 2.6 | 0.08 | 1 | 5.0 | 0.4 | 0.08 |
| Example 39 | 28.4 | 60 | 2 | 2.6 | 0.08 | 1 | 5.0 | 0.2 | 0.04 |
| Example 40 | 28.2 | 60 | 2 | 2.1 | 0.07 | 1 | 5.0 | 0.0 | 0.00 |
| Example 41 | 28.7 | 60 | 2 | 1.6 | 0.06 | 1 | 5.0 | 0.2 | 0.04 |
| Example 42 | 28.2 | 60 | 2 | 1.2 | 0.05 | 1 | 5.0 | 0.4 | 0.08 |
| Example 43 | 12.0 | 60 | 2 | 2.1 | 0.07 | 1 | 5.0 | 0.0 | 0.00 |
| Example 44 | 18.0 | 60 | 2 | 0.6 | 0.04 | 1 | 5.0 | 0.4 | 0.08 |
| Example 45 | 27.0 | 60 | 2 | 1.3 | 0.06 | 1 | 5.0 | 0.1 | 0.02 |
| Example 46 | 28.4 | 60 | 2 | 7.1 | 0.15 | 1 | 5.0 | 0.3 | 0.06 |
| Example 47 | 28.3 | 60 | 2 | 4.3 | 0.11 | 1 | 5.0 | 0.4 | 0.08 |
| Example 48 | 28.6 | 60 | 2 | 6.8 | 0.15 | 1 | 5.0 | 0.3 | 0.06 |
| Example 49 | 28.1 | 60 | 2 | 8.0 | 0.17 | 1 | 5.0 | 0.1 | 0.02 |
| Example 50 | 28.0 | 60 | 2 | 4.3 | 0.11 | 1 | 5.0 | 0.3 | 0.06 |
| Example 51 | 28.1 | 60 | 2 | 4.3 | 0.11 | 1 | 5.0 | 0.4 | 0.08 |
| Example 52 | 28.6 | 60 | 2 | 4.3 | 0.11 | 1 | 5.0 | 0.2 | 0.04 |
| Example 53 | 28.3 | 60 | 2 | 4.3 | 0.11 | 1 | 5.0 | 0.4 | 0.08 |
| Example 54 | 15.0 | 60 | 2 | 8.0 | 0.17 | 1 | 5.0 | 0.4 | 0.08 |
| Comparative Example 16 | 10.0 | 60 | 2 | 2.1 | 0.07 | 1 | 5.0 | 0.1 | 0.02 |
| Comparative Example 17 | 28.1 | 60 | 2 | 2.1 | 0.07 | 1 | 5.0 | 0.3 | 0.06 |
| Comparative Example 18 | 9.7 | 60 | 2 | 7.1 | 0.15 | 1 | 5.0 | 0.0 | 0.00 |

TABLE 7-continued

| | m (μm) | $L_t$ (mm) | $l_b$ (mm) | $l_e$ (mm) | σ | $l_c$ (mm) | d (mm) | $d_0$ (mm) | $d_0/d$ |
|---|---|---|---|---|---|---|---|---|---|
| Comparative Example 19 | 9.8 | 60 | 2 | 1.1 | 0.05 | 1 | 5.0 | 0.3 | 0.06 |
| Comparative Example 20 | 18.0 | 60 | 2 | 7.8 | 0.16 | 1 | 5.0 | 0.4 | 0.08 |
| Comparative Example 21 | 8.8 | 60 | 2 | _9.0_ | 0.18 | 1 | 5.0 | 0.2 | 0.04 |

Amoung them, $\sigma = \dfrac{l_e + l_b}{L_t}$.

The grain-oriented silicon steels having heat-resistant refined magnetic domain of Examples 38-54 and Comparative Examples 16-21 are obtained by the following steps of:
(1) performing ironmaking, steelmaking, and hot rolling with the grain-oriented silicon steel, and then cold rolling to a thickness of 0.226 mm;
(2) performing a decarburization annealing, and coating a separation agent MgO on the surface of the steel plate and kiln drying, then rolling into steel coils;
(3) annealing at a high temperature of 1200° C. for 20 hours, and washing off the unreacted residual MgO on the surface to obtain the cold-rolled plate;
(4) implementing laser grooving on the surface of one side of the cold-rolled plate, and the specific process parameters are listed in Table 8;
(5) coating a separation agent on the surface and performing final annealing to form the silicon steel plate.

Table 8 lists the specific process parameters of step (4) in the method for manufacturing the grain-oriented silicon steels having heat-resistant refined magnetic domain of Examples 38-54 and Comparative Examples 16-21.

TABLE 8

| | Single pulse instantaneous peak power density of sub-pot (W/mm²) | Ratio of single pulse instantaneous maximum peak power density to single pulse instantaneous minimum peak power density of the sub-spot | Ratio of the diameter of sub-spot to the interval between the focal centers of sub-spots | Total length of multiple sub-spots in laser scanning direction (mm) |
|---|---|---|---|---|
| Example 38 | 1.3E+10 | 8 | 0.33 | 6 |
| Example 39 | 1.3E+09 | 5 | 0.33 | 6 |
| Example 40 | 1.7E+08 | 5 | 0.32 | 5 |
| Example 41 | 2.2E+07 | 2 | 0.30 | 4 |
| Example 42 | 3.3E+06 | 2 | 0.26 | 3 |
| Example 43 | 5.0E+05 | 1 | 0.32 | 5 |
| Example 44 | 5.0E+11 | 1 | 0.19 | 2 |
| Example 45 | 4.1E+07 | 2 | 0.79 | 6 |
| Example 46 | 1.2E+08 | 2 | 0.11 | 15 |
| Example 47 | 1.2E+08 | 2 | 0.16 | 10 |
| Example 48 | 8.3E+07 | 2 | 0.16 | 15 |
| Example 49 | 6.2E+07 | 2 | 0.16 | 20 |
| Example 50 | 1.2E+08 | 1 | 0.16 | 10 |
| Example 51 | 1.2E+08 | 5 | 0.16 | 10 |
| Example 52 | 1.2E+08 | 10 | 0.16 | 10 |
| Example 53 | 1.2E+08 | 15 | 0.16 | 10 |
| Example 54 | 1.2E+08 | 20 | 0.16 | 10 |
| Comparative Example 16 | _4.5E+05_ | 1 | 0.32 | 5 |
| Comparative Example 17 | _5.3E+11_ | 1 | 0.19 | 2 |
| Comparative Example 18 | 1.2E+08 | _21_ | 0.16 | 10 |
| Comparative Example 19 | 4.8E+07 | 2 | _0.82_ | 5 |
| Comparative Example 20 | 1.2E+08 | 2 | _0.09_ | 18 |
| Comparative Example 21 | 2.1E+07 | 2 | 0.30 | _21_ |

The grain-oriented silicon steels having heat-resistant refined magnetic domain of Examples 38-54 and Comparative Examples 16-21 were tested for magnetic conductive performance ($B_8$) and iron loss ($P_{17/50}$), specifically using Epstein method to test the magnetic flux density of the grain-oriented silicon steel under an exciting magnetic field of 800 A/m, and the values $B_8$ in T were obtained; Epstein method was used to test the ineffective electric energy consumed by the magnetization of the grain-oriented silicon steel when the magnetic flux density reaches 1.7 T under an AC excitation field of 50 Hz, and the values $P_{17/50}$ in W/Kg were obtained. "Method for measuring density, resistivity and stacking factor of an electrical steel sheet (strip) in GB/T19289-2003" was used to test lamination factors of the grain-oriented silicon steels having heat-resistant refined magnetic domain of Examples 38-54 and Comparative Examples 16-21. The test results are listed in Table 9.

TABLE 9

| | $P_{17/50}$ (W/kg) | $B_8$ (T) | Lamination factor |
|---|---|---|---|
| Example 38 | 0.783 | 1.910 | 96.1% |
| Example 39 | 0.779 | 1.914 | 96.4% |
| Example 40 | 0.788 | 1.912 | 96.9% |
| Example 41 | 0.791 | 1.907 | 96.5% |
| Example 42 | 0.796 | 1.911 | 96.6% |
| Example 43 | 0.799 | 1.919 | 96.8% |
| Example 44 | 0.788 | 1.907 | 95.8% |
| Example 45 | 0.799 | 1.920 | 97.2% |
| Example 46 | 0.789 | 1.911 | 95.2% |
| Example 47 | 0.779 | 1.909 | 96.1% |
| Example 48 | 0.788 | 1.914 | 96.2% |
| Example 49 | 0.796 | 1.921 | 97.1% |

TABLE 9-continued

|  | $P_{17/50}$ (W/kg) | $B_8$ (T) | Lamination factor |
|---|---|---|---|
| Example 50 | 0.789 | 1.916 | 96.9% |
| Example 51 | 0.791 | 1.911 | 96.6% |
| Example 52 | 0.789 | 1.915 | 96.2% |
| Example 53 | 0.791 | 1.911 | 95.9% |
| Example 54 | 0.798 | 1.918 | 95.5% |
| Comparative Example 16 | 0.843 | 1.924 | 97.2% |
| Comparative Example 17 | 0.798 | 1.911 | 94.5% |
| Comparative Example 18 | 0.832 | 1.911 | 94.0% |
| Comparative Example 19 | 0.821 | 1.922 | 97.3% |
| Comparative Example 20 | 0.802 | 1.909 | 94.2% |
| Comparative Example 21 | 0.837 | 1.920 | 97.1% |

It can be seen from Table 9 that values of $P_{17/50}$ and $B_8$ of Examples 38~54 in this case are all good.

In Comparative Examples 16 and 17, the single pulse instantaneous peak power densities of the sub-pots are not within the scope of the present invention. $P_{17/50}$ of the silicon steel plate of Comparative Example 16 is obviously poor, and the lamination factor of Comparative Example 17 is significantly reduced;

in Comparative Example 18, the ratio of the maximum value to the minimum value of the single pulse instantaneous peak power density of the sub-spot is not within the scope of the present invention, resulting in poor magnetic performance and poor lamination factor;

in Comparative Examples 19 and 20, the ratio of the diameter of the sub-spot to the interval between the focal centers of the sub-spots is not within the scope of the present invention. $P_{17/50}$ of Comparative Example 19 is poor, and $P_{17/50}$ and the lamination factor of Comparative Example 20 are poor;

in Comparative Example 21, the total length of the multiple sub-spots in the laser scanning direction is not within the scope of the present invention, making the value $P_{17/50}$ poor.

It should be noted that the prior art part of the protection scope of the present invention is not limited to the embodiments given in this application document, and all prior arts that do not contradict the solution of the present invention, including but not limiting the previous patent documents, prior publications, prior public use, etc., can all be included in the protection scope of the present invention.

In addition, the combination of various technical features in this case is not limited to the combination described in the claims of this case or the combination described in the specific embodiments. All technical features described in this case can be freely combined or integrated in any way, unless conflicts arise among them.

It should also be noted that the embodiments listed above are only specific embodiments of the present invention. Obviously, the present invention is not limited to the above embodiments, and the subsequent similar changes or modifications that can be directly derived from or easily associated with the disclosure of the present invention by those skilled in the art, should fall within the protection scope of the present invention.

The invention claimed is:

1. A grain-oriented silicon steel having heat-resistant refined magnetic domain, the grain-oriented silicon steel comprising:
    multiple parallel grooves formed by grooving on surface of one side or of both sides of the grain-oriented silicon steel,
    wherein each groove extends in a width direction of the grain-oriented silicon steel, and said multiple parallel grooves are uniformly distributed along a rolling direction of the grain-oriented silicon steel having the heat-resistant refined magnetic domain,
    wherein said each groove that extends in the width direction of the grain-oriented silicon steel is formed by splicing multiple sub-grooves that extend in the width direction of the grain-oriented silicon steel having heat-resistant refined magnetic domain,
    wherein a cross-section of said each sub-groove in the width direction of the grain-oriented silicon steel is in shape of inverted trapezoid, a long side of the trapezoid has a length $L_t$, and a hypotenuse of the trapezoid has a projected length $l_e$ in the width direction of the grain-oriented silicon steel, and
    wherein the projected length $l_e$ is in a range of no more than 8 mm.

2. The grain-oriented silicon steel having heat-resistant refined magnetic domain according to claim 1, wherein the trapezoid has a height m of 5 μm-60 μm.

3. The grain-oriented silicon steel having heat-resistant refined magnetic domain according to claim 1, wherein, among said multiple sub-grooves that forms into one groove, two adjacent sub-grooves are spliced in way of being closely connected with each other, or overlapping with each other, or being transversely spaced with each other.

4. The grain-oriented silicon steel having heat-resistant refined magnetic domain according to claim 3, wherein the two adjacent sub-grooves have a transverse space $l_b$ of no more than 10 mm when transversely spaced with each other.

5. The grain-oriented silicon steel having heat-resistant refined magnetic domain according to claim 4, wherein following formula is satisfied $$\frac{l_e + l_b}{L_t} \leq 0.2$$

wherein, $L_t$ is the length of the long side of the trapezoid, $l_e$ is the projected length of the hypotenuse of the trapezoid in the width direction of the grain-oriented silicon steel having heat-resistant refined magnetic domain, and $l_b$ is a lateral spacing.

6. The grain-oriented silicon steel having heat-resistant refined magnetic domain according to claim 3, wherein the two adjacent sub-grooves have an overlapping length $l_e$ of an overlapped section of no more than 1.5 times of $l_e$ when the two adjacent sub-grooves overlap each other.

7. The grain-oriented silicon steel having heat-resistant refined magnetic domain according to claim 1, wherein adjacent grooves have a spacing d of 2-10 mm therebetween.

8. The grain-oriented silicon steel having heat-resistant refined magnetic domain according to claim 1, wherein adjacent grooves have a spacing d of 2 mm-10 mm, and the sub-grooves spliced into one groove have offset spacings $d_o$ of no more than 0.4d in the rolling direction of the grain-oriented silicon steel.

9. The grain-oriented silicon steel having heat-resistant refined magnetic domain according to claim 1, wherein a grooving method of making the grooves is at least one selected from laser grooving, electrochemical grooving, teeth roller grooving, and high-pressure water jet grooving.

10. A method for manufacturing the grain-oriented silicon steel having heat-resistant refined magnetic domain according to claim 1, comprising steps of: forming grooves on surface of one side or both sides of the grain-oriented silicon steel by means of laser grooving, wherein the laser beam of the laser grooving is split into multiple sub-beams by a beam splitter for forming multiple sub-grooves that are spliced into one groove; thereby producing the grain-oriented silicon steel of claim 1.

11. The method according to claim 10, wherein a laser generating pump used for laser grooving is at least one selected from $CO_2$ lasers, solid-state lasers, and fiber lasers.

12. The method according to claim 10, wherein a sub-spot formed by a single said sub-beam on the surface of the grain-oriented silicon steel has a single pulse instantaneous peak power density of $5.0 \times 10^5$ W/mm$^2$-$5.0 \times 10^{11}$ W/mm$^2$.

13. The method according to claim 12, wherein a ratio of the single pulse instantaneous maximum peak power density to the single pulse instantaneous minimum peak power density of the sub-spot is no more than 20.

14. The method according to claim 12, wherein a ratio of the diameter of the sub-spot to the interval between the focal centers of the sub-spots is in the range of 0.1-0.8.

15. The method according to claim 10, wherein the multiple sub-spots formed by the multiple sub-beams on the surface of the grain-oriented silicon steel have a total length of not more than 20 mm in the laser scanning direction.

16. The method according to claim 10, wherein the laser grooving is performed before or after the step of decarburization annealing of the grain-oriented silicon steel having heat-resistant refined magnetic domain; or, before or after the step of hot stretching leveling annealing of the grain-oriented silicon steel having heat-resistant refined magnetic domain.

* * * * *